US012563266B2

(12) United States Patent　　　(10) Patent No.: US 12,563,266 B2
Sailaja et al.　　　　　　　　　　(45) Date of Patent: Feb. 24, 2026

(54) USER-BASED CONTENT FILTERING

(71) Applicant: Roku, Inc., San Jose, CA (US)

(72) Inventors: Neena Mohanachandran Sailaja, Cambridge (GB); Trent Parker, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/468,017

(22) Filed: Sep. 15, 2023

(65) Prior Publication Data

US 2025/0097531 A1　　Mar. 20, 2025

(51) Int. Cl.
　　H04N 21/454　　　(2011.01)
　　H04N 21/45　　　(2011.01)
(52) U.S. Cl.
　　CPC ..... H04N 21/4542 (2013.01); H04N 21/4532 (2013.01)
(58) Field of Classification Search
　　None
　　See application file for complete search history.

(56) References Cited

U.S. PATENT DOCUMENTS

| 6,167,376 | A | 12/2000 | Ditzik | |
| 8,904,420 | B2 | 12/2014 | Mountain | |
| 2002/0147782 | A1* | 10/2002 | Dimitrova | H04N 21/4394 |
| | | | | 709/207 |
| 2004/0049780 | A1* | 3/2004 | Gee | H04N 21/44008 |
| | | | | 725/35 |
| 2006/0130119 | A1* | 6/2006 | Candelore | H04N 7/163 |
| | | | | 725/135 |
| 2007/0067810 | A1* | 3/2007 | Durden | H04N 21/235 |
| | | | | 348/E7.071 |
| 2011/0072452 | A1* | 3/2011 | Shimy | H04N 21/44218 |
| | | | | 725/25 |
| 2011/0093882 | A1 | 4/2011 | Candelore et al. | |
| 2012/0167123 | A1* | 6/2012 | Gavita | H04N 21/4751 |
| | | | | 725/25 |
| 2014/0181910 | A1* | 6/2014 | Fingal | H04L 63/107 |
| | | | | 726/4 |
| 2015/0070516 | A1 | 3/2015 | Shoemake et al. | |
| 2016/0316265 | A1* | 10/2016 | Gopalan | H04N 21/8547 |
| 2017/0272818 | A1* | 9/2017 | Gattis | H04N 21/4394 |
| 2018/0136950 | A1* | 5/2018 | Lefevre | H04H 60/40 |
| 2019/0174183 | A1* | 6/2019 | Ashoori | H04N 21/845 |
| 2019/0364120 | A1* | 11/2019 | Bandela | H04N 21/4223 |
| 2021/0329338 | A1* | 10/2021 | Khov | G06N 3/045 |
| 2022/0132209 | A1* | 4/2022 | Puri | H04N 21/4545 |
| 2025/0097523 | A1 | 3/2025 | Sailaja et al. | |

* cited by examiner

*Primary Examiner* — Alexander Q Huerta
(74) *Attorney, Agent, or Firm* — STERNE, KESSLER, GOLDSTEIN & FOX P.L.L.C

(57) ABSTRACT

Disclosed herein are system, apparatus, article of manufacture, method and/or computer program product embodiments, and/or combinations and sub-combinations thereof, for user-based content filtering. A type of content indicated by a user profile associated with a request for a content item may be identified. An occurrence of the type of content within the content item may be identified. Filtering data that comprises one or more instructions for user devices to modify (e.g., blur, alter, obfuscate, etc.) a visual representation of the identified occurrence of the type of content during playback may be generated. The content item and the filtering data may be sent to a user device associated with the user profile.

20 Claims, 8 Drawing Sheets

200

Media Device
106

Processing Module
204

Audio Decoder(s)
212

Video Decoder(s)
214

Storage/Buffers
208

Streaming Module
202

User Interface
Module
206

Audio Command
Processing
Module
216

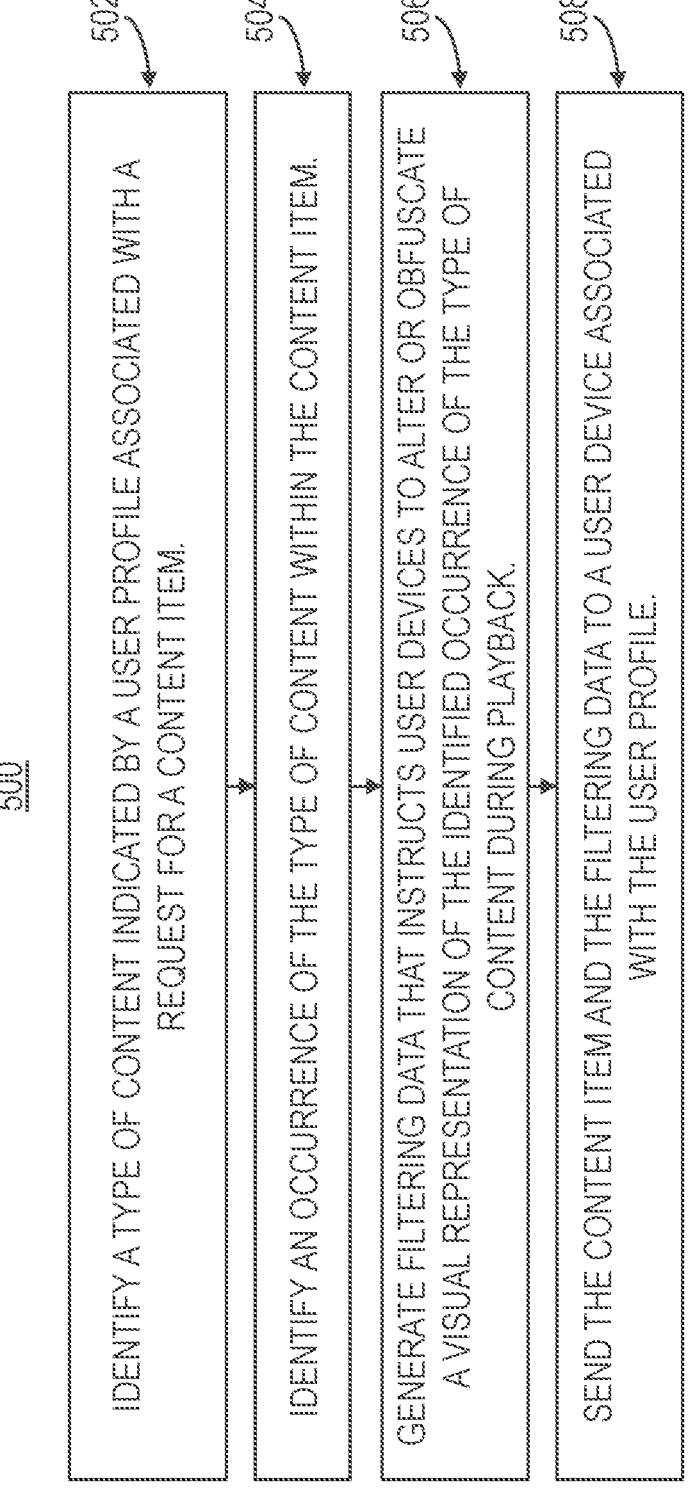

500

502 IDENTIFY A TYPE OF CONTENT INDICATED BY A USER PROFILE ASSOCIATED WITH A REQUEST FOR A CONTENT ITEM.

504 IDENTIFY AN OCCURRENCE OF THE TYPE OF CONTENT WITHIN THE CONTENT ITEM.

506 GENERATE FILTERING DATA THAT INSTRUCTS USER DEVICES TO ALTER OR OBFUSCATE A VISUAL REPRESENTATION OF THE IDENTIFIED OCCURRENCE OF THE TYPE OF CONTENT DURING PLAYBACK.

508 SEND THE CONTENT ITEM AND THE FILTERING DATA TO A USER DEVICE ASSOCIATED WITH THE USER PROFILE.

IDENTIFY A TYPE OF CONTENT INDICATED BY A USER PROFILE ASSOCIATED WITH A REQUEST FOR A CONTENT ITEM.

604

IDENTIFY AN OCCURRENCE OF THE TYPE OF CONTENT WITHIN THE CONTENT ITEM.

606

MODIFY THE CONTENT ITEM TO FILTER THE OCCURRENCE OF THE TYPE OF CONTENT DURING PLAYBACK OF THE CONTENT ITEM.

608

SEND THE MODIFIED CONTENT ITEM TO A USER DEVICE ASSOCIATED WITH THE USER PROFILE.

700

702 RECEIVE A REQUEST FOR A CONTENT ITEM.

704 RECEIVE FILTERING DATA AND THE CONTENT ITEM.

706 FILTER A VISUAL REPRESENTATION OF THE IDENTIFIED OCCURRENCE OF THE TYPE OF CONTENT DURING PLAYBACK OF THE CONTENT ITEM.

USER-BASED CONTENT FILTERING

FIELD

This disclosure is generally directed to content delivery, and more particularly to user-based content filtering.

SUMMARY

Provided herein are system, apparatus, article of manufacture, method and/or computer program product embodiments, and/or combinations and sub-combinations thereof, for user-based content filtering. A content delivery system may identify a type of content indicated by a user profile associated with a request for a content item. An occurrence of the type of content within the content item may be identified. Filtering data that include one or more instructions for user devices to modify (e.g., blur, alter, modify, etc.) a visual representation of the identified occurrence of the type of content during playback may be generated. The content item and the filtering data may be sent to a user device associated with the user profile.

BRIEF DESCRIPTION OF THE FIGURES

The accompanying drawings are incorporated herein and form a part of the specification.

FIG. 5 illustrates a flowchart of an example method for user-based content filtering, according to some aspects of this disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
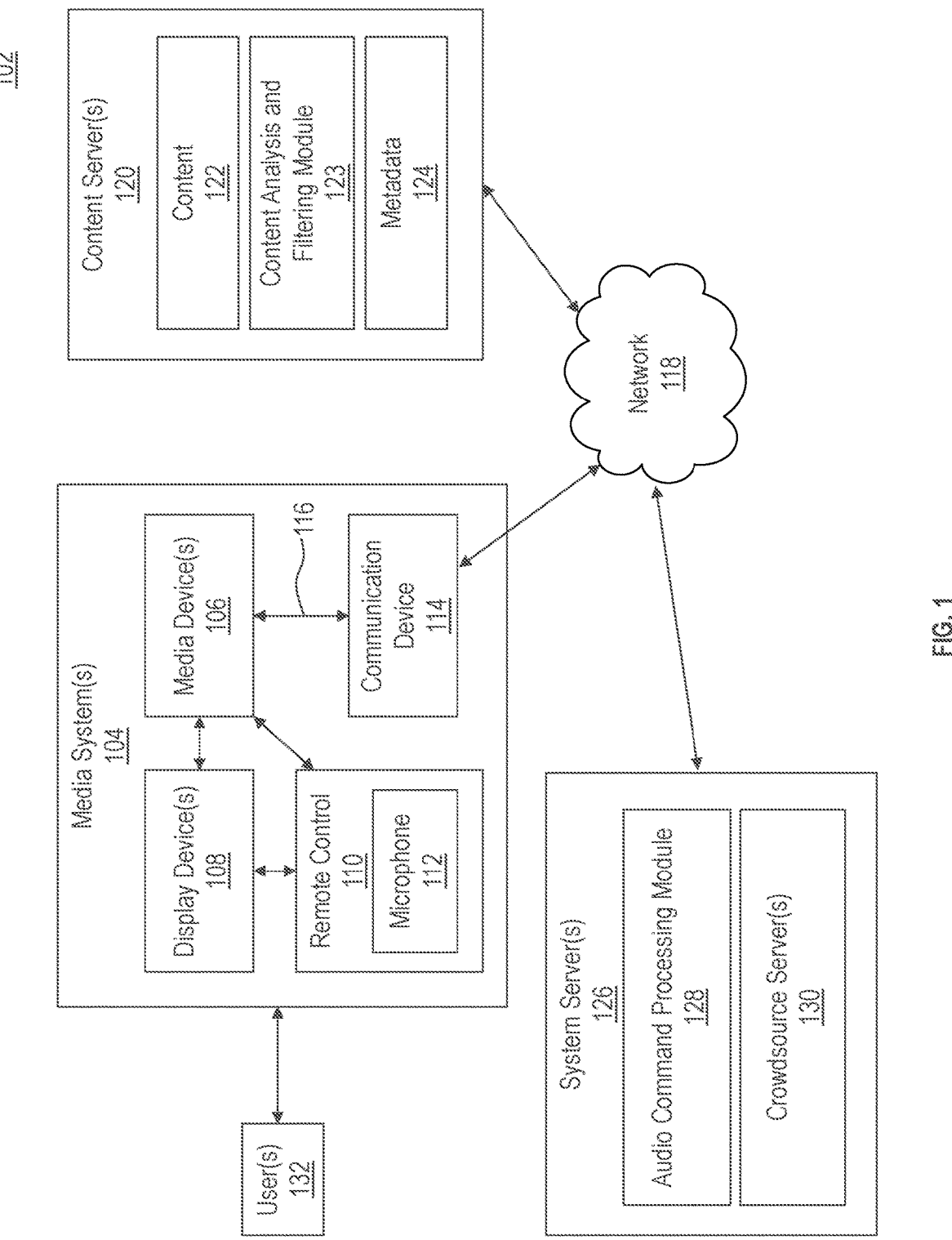
FIG. 1 illustrates a block diagram of a multimedia environment, according to some aspects of this disclosure.

Consumers of content and/or content items, such as viewers of movies, shows, and related media, have unique sensitivities and comfort levels with various types of content. This is particularly because people have different fears, phobias, or dislikes. Viewers are often unable to avoid seeing undesired images while watching content items or related media other than by turning off a media device to end the content item or by closing their eyes. For example, it may be common for viewers to see machetes, blood, insects, and/or other phobia-triggering material in movies of certain genres. However, conventional content delivery and/or media environments fail to provide a way to filter and/or modify content items if a person is fearful of machetes, blood, insects, and/or other phobia-triggering material.

Provided herein are system, apparatus, device, method and/or computer program product embodiments, and/or combinations and sub-combinations thereof, for user-based content filtering. According to some aspects of this disclosure, a content delivery system and/or a multimedia environment may filter and/or modify content items based on who is watching. By allowing for content filtering based on user profiles, the media environment, as described herein, can create a more personalized and safer viewing experience. The system, apparatus, device, method and/or computer program product embodiments, and/or combinations and sub-combinations thereof, for user-based content filtering, provide a proactive approach that respects the mental and emotional well-being of users, to enable the users to engage with content items that align with their preferences and avoid exposure to phobia triggering material. As described herein, user-based content filtering allows a media system to adapt and/or customize content delivery responsive to the preferences of a diverse user base.

For example, a content item playback experience may be customized by a predictive model to blur, fog, obscure, modify, etc. sensitive images based on identified users/viewers and/or unique user profiles. Additionally, as described herein, user-based content filtering may consider any media licenses and/or legal rights to modify content, and filtering and/or modification actions may be automatically updated, adjusted, limited, and/or the like. Notifications and/or messages may be generated and/or displayed, either automatically or on demand, to communicate to a user that a content item has been modified from its original form and specify any modification and/or filtering effects. These and other technological advantages are described herein.

As used in the specification and the appended claims, "content items" may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether the format is presently known or developed in the future. Content items may be any combination of the above-described formats.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. Multimedia environment 102 may support and/or facilitate user-based content filtering. For example, multimedia environment 102 may operate to automatically filter sensitive content, such as phobia-triggering content and/or the like, from content items before or during playback on a media device based on user preferences and/or filtering instructions indicated by a user profile. Multimedia environment 102 illustrates an example environment, architecture, ecosystem, etc., in which various aspects of this disclosure may be implemented. However, multimedia environment 102 is provided solely for illustrative purposes and is not limiting. Embodiments of this disclosure may be implemented and/or used in environments different from and/or in addition to multimedia environment 102 of FIG. 1, as will be appreciated by persons skilled in the relevant art(s) based on the teachings described herein.

In a non-limiting example, multimedia environment 102 may be directed to streaming media. However, this disclosure is applicable to any type of media (instead of or in addition to streaming media), as well as any mechanism, means, protocol, method, and/or process for distributing media.

Multimedia environment 102 may include one or more media systems 104. According to some aspects of this disclosure, media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. According to some aspects of this disclosure, user(s) 132 may interact with the media system 104 to query, select, and/or consume content items.

Each media system 104 may include one or more media devices 106 coupled to one or more display devices 108. It is noted that terms such as "coupled," "connected to," "attached," "linked," "combined" and similar terms may refer to physical, electrical, magnetic, logical, etc., connections unless otherwise specified herein.

Media system 104 may include devices and/or components supporting and/or facilitating linear television, inter-device/component communications (e.g., HDMI inputs connected to gaming devices, etc.), online communications (e.g., content item streaming, Internet browsing, etc.) and/or the like.

According to some aspects of this disclosure, the media device 106 may be a streaming media device, a streaming set-top box (STB), cable and satellite STB, a DVD or BLU-RAY device, audio/video playback device, cable box, and/or digital video recording device, to name just a few examples. Display device 108 may be a monitor, television (TV), computer, mobile device, smart device, tablet, wearable (such as a watch or glasses), appliance, internet of things (IoT) device, and/or projector, to name just a few examples. According to some aspects of this disclosure, media device 106 can be a part of, integrated with, operatively coupled to, and/or connected to its respective display device 108.

Figure 2:
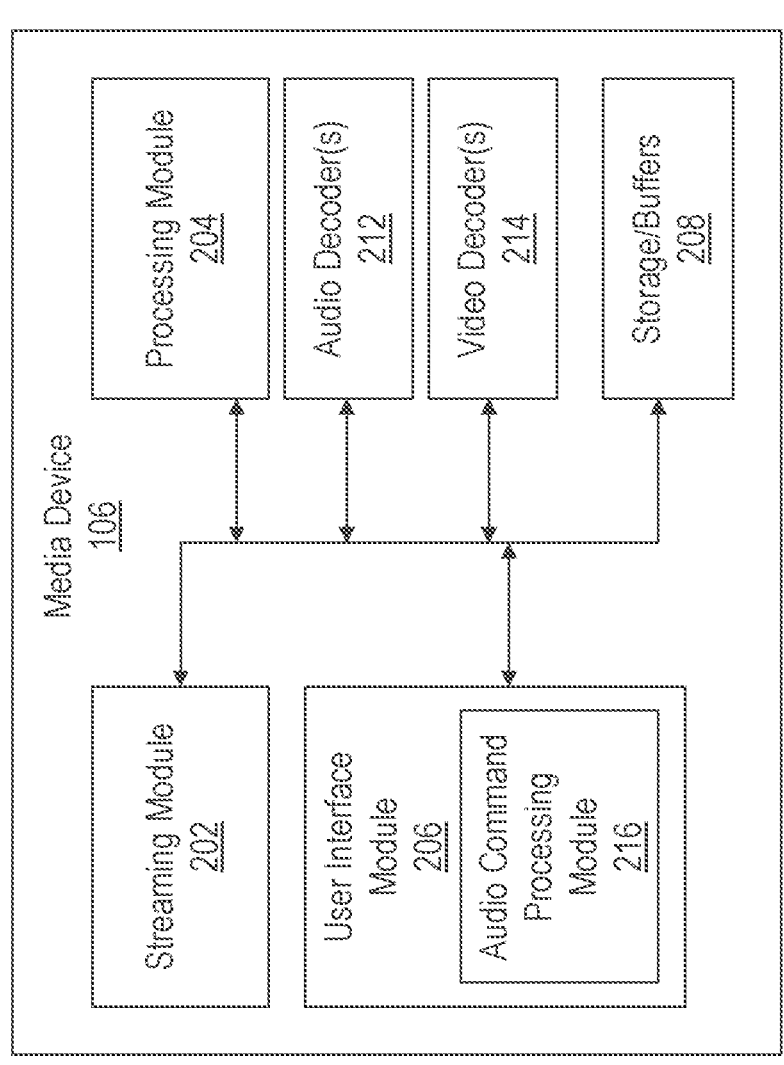
FIG. 2 illustrates a block diagram of a streaming media device, according to some aspects of this disclosure.

FIG. 2 illustrates a block diagram 200 of an example media device 106, according to some embodiments. Media device 106 may include a streaming module 202, processing module 204, storage/buffers 208, and a user interface module 206. The user interface module 206 may include an audio command processing module 216.

According to some aspects of this disclosure, the media device 106 may include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

Network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

According to some aspects of this disclosure, media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. According to some aspects of this disclosure, the remote control 110 wirelessly communicates with the media device 106 and/or display device 108 using cellular, Bluetooth, infrared, etc., or any combination thereof. The remote control 110 may include a microphone 112, which is further described below.

According to some aspects of this disclosure, multimedia environment 102 may include a plurality of content servers 120 (also called edge servers, content providers, manifest servers, channels, content server(s) 120, etc.). Although only one content server 120 is shown in FIG. 1, in practice the multimedia environment 102 may include any number of content servers 120. Each content server 120 may be configured to communicate with network 118. Content server(s) 120, media device(s) 106, and display device(s) 108 may be collectively referred to as a media system, which may be an extension of media system(s) 104. According to some aspects of this disclosure, a media system may include system server(s) 126 as well.

According to some aspects of this disclosure, the content server(s) 120 may include a content analysis and filtering module 123. The content server(s) 120 may operate with crowdsource server(s) 130, and/or media device(s) 106 to cause pre-modification, modification, and/or filtering during future streaming of content items. For example, the content analysis and filtering module 123 may include one or more trained machine learning models that use techniques including, but not limited to, video recognition, object detection, image classification, anomaly detection, natural language processing, and/or the like to identify types of content within content items that may be modified and/or filtered according to user preferences, filtering instructions, and/or the like. For example, labeled data may be used in a predictive model to categorize content into predefined classes (e.g., phobia-triggering, sensitive material, etc.), which may then be used to filter new, unseen content.

According to some aspects of this disclosure, each content server 120 may store content 122 and metadata 124. Content 122 may include advertisements, promotional content, commercials, and/or any advertisement-related content. According to some aspects of this disclosure, content 122 may include any combination of advertising supporting content including, but not limited to, content items (e.g. movies, episodic serials, documentaries, content, etc.), music, videos, movies, TV programs, multimedia, images, still pictures, text, graphics, gaming applications, ad campaigns, programming content, public service content, government content, local community content, software, and/or any other content and/or data objects in electronic form.

Metadata 124 includes data about content 122. For example, metadata 124 may include associated or ancillary information indicating or related to a writer, director, producer, composer, artist, actor, summary, chapters, production, history, year, trailers, alternate versions, related content, applications, closed captioning data/information, audio description data/information, objects and/or types of content (e.g., phobia-triggering, sensitive material, etc.) depicted and/or identified in content 122, temporal information (e.g., timestamps, time windows, etc.) associated with occurrences of objects and/or types of content depicted in content 122, descriptive information for objects and/or types of content depicted in content 122, and/or any other information pertaining or relating to the content 122. Metadata 124 may also (or alternatively) include links to any such information pertaining or relating to the content 122. Metadata 124 may also (or alternatively) include one or more indexes of content 122, such as but not limited to a trick mode index.

Multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126. System server(s) 126 and content server(s) 120 together may be referred to as a media server system. An overall media system may include a media server system and media system(s) 104. For example, a media system may refer to the overall media system including the media server system and media system(s) 104.

System server(s) 126 may include an audio command processing module 128. As noted above, the remote control 110 may include a microphone 112. The microphone 112 may receive audio data from users 132 (as well as other sources, such as the display device 108). According to some aspects of this disclosure, the media device 106 may be audio responsive, and the audio data may represent verbal commands from the user 132 to control the media device 106 as well as other components in media system 104, such as the display device 108.

According to some aspects of this disclosure, audio data received by the microphone 112 in the remote control 110 is transferred to the media device 106, which is then forwarded to the audio command processing module 128 in the system server(s) 126. The audio command processing module 128 may operate to process and analyze the received audio data to recognize the user 132's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 128 in the system server(s) 126, or the verbal command recognized by the audio command processing module 216 in the media device 106).

Now referring to both FIGS. 1 and 2, according to some aspects of this disclosure, user 132 may interact with the media device 106 via, for example, the remote control 110. For example, user 132 may use the remote control 110 to interact with the user interface module 206 of the media device 106 to query/search and/or select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

According to some aspects of this disclosure, for example, in streaming embodiments, the streaming module 202 may transmit content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, media device(s) 106 may exist in thousands or millions of media systems 104. Accordingly, media device(s) 106 may lend themselves to crowdsourcing embodiments, and, system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between user requests for content items, closed captioning requests issued by different users 132 watching a content item, advertisement, and/or the like. Based on such information, the crowdsource server(s) 130 may identify opportunities to improve a content viewing experience.

For example, the crowdsource server(s) 130 determine that turning closed captioning on may enhance users' viewing experience at particular portions of the video content item, advertisement, and/or the like (for example, when the soundtrack of the video content item, advertisement, and/or the like is difficult to hear), and turning closed captioning off may enhance users' viewing experience at other portions of the video content item, advertisement, and/or the like (for example, when displaying closed captioning obstructs critical visual aspects of the content item, advertisement, and/or the like). Accordingly, crowdsource server(s) 130 may operate to cause closed captioning to be automatically turned on and/or off during future streaming of the content item, advertisement, and/or the like.

According to some aspects of this disclosure, using information received from the media devices 106 (and/or user device(s) 103) in the thousands and millions of media systems 104, the crowdsource server(s) 130 may identify media devices (and/or user devices) to target with and/or acquire from bid stream data, communications, information, and/or the like. For example, the most popular content items may be determined based on the amount of content items are requested (e.g., viewed, accessed, etc.) by media devices 106.

According to some aspects of this disclosure, using information received from the media devices 106 in the thousands and millions of media systems 104, the crowdsource server(s) 130 may identify similarities and overlaps between closed captioning requests issued by different users 132 watching a particular movie. Based on such information, the crowdsource server(s) 130 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 130 may operate to cause closed captioning to be automatically turned on and/or off during future streaming of the movie.

According to some aspects of this disclosure, using information received from the media devices 106 in the thousands and millions of media systems 104 describing content items that are modified and/or filtered for playback, the crowdsource server(s) 130 may identify types of content that routinely prompt the content items to be modified and/or filtered, such as common phobia-triggering content and/or sensitive content. Information describing identified types of content that routinely prompt content items to be modified and/or filtered may be stored and/or indexed. Accordingly, the crowdsource server(s) 130 may operate with the content server(s) 120 and/or media device(s) 106 to cause pre-modification, modification, and/or filtering during future streaming of content items. According to some aspects of this disclosure, functions and/or operations performed by content server(s) 120 may be implemented by system server(s) 126 as well.

User-Based Content Filtering

Figure 3:
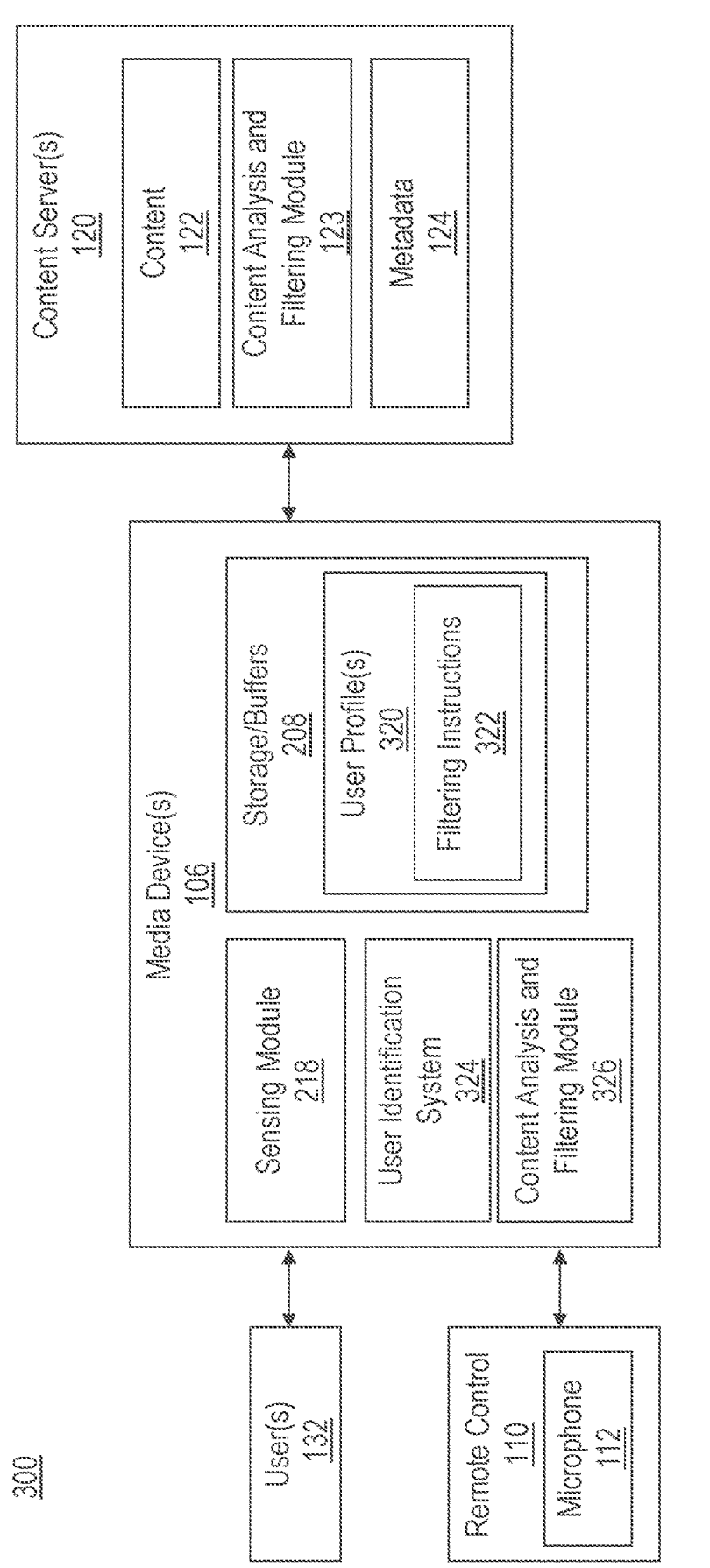
FIG. 3 illustrates a block diagram of a multimedia environment, according to some aspects of this disclosure.

FIG. 3 illustrates a block diagram of a multimedia environment 300 for user-based content filtering. Multimedia environment 300 is an example of multimedia environment 102 (FIG. 1) and any device and/or component described for multimedia environment 102 may operate similarly to as described in FIG. 1, even if certain devices, components, and/or modules shown in FIG. 1 are not shown in FIG. 3, and vice versa. Multimedia environment 300 facilitates the personalization of the playback experience for content items such that types of content are filtered from the content items based on viewer preferences. A predictive model may be trained to identify images or depictions of types of content (e.g., phobia-triggering, sensitive material, etc.) within a content item and cause identified images to be blurred, modified, obscured, and/or the like if user-preferred. Users may provide their choices (e.g., content filtering instructions, etc.) to identify images or depictions of types of content they want to blur, modify, obscure, and/or the like during playback of additional content items. Images or depictions of types of content in content items may be blurred, modified, obscured, and/or the like without modifying the actual content item or affecting any Digital Rights Management (DRM) licensing.

Multimedia environment 300 may receive filtering instructions from the user(s) 132. For example, a user 132 may use the remote control 110 to interact with the user interface module 206 of the media device 106 to provide filtering instructions 322 that indicate types of content that should be filtered from content items and/or the like. The media device 106 may store the filtering instructions 322 via storage/buffer 208 using a user profile 320. According to some aspects, the media device 106 may send the filtering instructions 322 to the content server(s) 120 to be associated with a user profile (e.g., user profile 320, etc.) for user 132. Additionally, user profile(s) 320 may include identification information for a user(s) 132 including, but not limited to, image data, biometric information, voice print information, usage data, and/or the like.

Media device 106 may store (e.g., via storage/buffers 208, etc.) one or more user profiles(s) 320 that are associated with one or more user(s) 132. For example, user(s) 132 can be members of a household and a user account can include user profile(s) 320 for user(s) 132. According to some aspects of this disclosure, a user profile 320 may include respective user preferences for each member of the household associated with user account 432. For example, different user profile(s) 320 can be related to and store information about user settings of media systems 104 and customized filtering instructions for filtering types of content from content items for different user(s) 132. Types of content to be filtered from the depiction in content items may include, but are not limited to, certain objects, scenarios/situations, locations, people, animals, colors, color patterns, lighting effects, and/or the like.

According to some aspects of this disclosure, content items requested for playback may be filtered (and/or modified) based on a user profile 320 associated with the requests. For example, media device 106 may send a request to content server 120 for a particular content item. Information including, but not limited to, historical content item requests, user login information, device and/or user identifiers, and/or the like may be used to identify or forecast/infer a particular user 132 associated with the request for the content item. For example, if a content item is requested during a time or period when requests for content items are historically requested by a particular user 132, or according to a viewing and/or usage pattern for a particular user 132, then a current request for a content item may be assumed to be from the particular user 132. The user profile 320 associated with the particular user 132 may be accessed and filtering instructions 322 may be used for user-based filtering of the requested content item.

According to some aspects of this disclosure, content items, either during playback or when requested for playback, may be filtered (and/or modified) based on filtering instructions associated with one or more user(s) 132 that are detected within the vicinity of a media device 106. For example, media device(s) 106 may include a user identification system 324. Although shown as a part of media device(s) 106, according to some aspects, user identification system 324 may be implemented by content server(s) 120 and/or system server(s) 130 based on information received from media device(s) 106.

User identification system 324 may use information from sensing module 218 to identify audiences within the vicinity of media device(s) 106, such as user(s) 132. For example, sensing module 218 may microphones, audio sensors, image sensors, passive Infrared (PIR) sensors, ultrasonic sensors, microwave sensors, infrared sensors, pressure sensors, capacitive proximity sensors, Bluetooth and Wi-Fi beacons, heat/thermal sensors, Light Detection and Ranging (LiDAR) sensors, and/or any other device or component that may capture information regarding an environment. For example, sensing module 218 may identify (e.g., via sensing signals, etc.) when the user(s) 132 enters media system 104 and/or within the vicinity of sensing module 218.

As shown, sensing module 218 may be integrated into media device(s) 106. According to some aspects of this disclosure, sensing module 218 may be integrated to display device(s) 108, remote control 110, or any other device/component used by user(s) 132 to interact with media systems 104. According to some aspects of this disclosure, sensing module 218 may be a stand-alone module outside of media device(s) 106, display device(s) 108, remote control 110, or any other device/component used by the user(s) 132 to interact with media systems 104. Implemented as a stand-alone device, sensing module 218 may be physically located within the vicinity of media device(s) 106 to detect user(s) 132. Media device(s) 106 may receive information from sensing module 218 to identify one or more user(s) 132 within the vicinity of media device(s) 106 (e.g., based on identification information in one or more captured sensing signals, etc.).

Information from sensing module 218 used to identify a user 132 may also be used to identify a user profile associated with the user 132. User profiles may store preferences and/or related information that indicates types of content that should be filtered from content items before and/or during playback of the content item via a media device 106.

According to some aspects of this disclosure, user identification system 324 may identify one or more user(s) 132 as adults, children, members of a household, guests, or other categories. User identification system 324 may use facial recognition may be applied to image data captured by sensing module 218 and facial features may be mapped to facial feature information indicated by a use profile 320 to identify a user 132. One or more user device (e.g., mobile device, smart device, computing device, etc.) signals and/or identifiers may be detected by sensing module 218 and the signals and/or identifiers may be mapped to signal types and/or identifiers indicated by a use profile 320 to identify a user 132. According to some aspects of this disclosure, user identification system 324 may use geofencing and/or the like to detect users and/or user devices in proximity to a media device 106.

According to some aspects of this disclosure, user identification system 324 may include a predictive model trained on labeled data associated with types of data collected by sensing module 218 to identify users (e.g., user(s) 132, etc.) and/or user profiles (e.g., user profile(s) 320, etc.) based on data collected by sensing module 218. Any information captured by sensing module 218 may be mapped to user-identifying information indicated by a use profile 320 to identify a user 132.

According to some aspects of this disclosure, when multiple users 132 are identified in the proximity of a media device 106 (e.g., by sensing module 218), filtering instructions 322 indicated by a user profile 320 having the highest priority associated with a user of the multiple users 132 can be used. For example, filtering instructions 322 indicated by a user profile 320 for an identified child may have a higher priority than filtering instructions 322 indicated by a user profile 320 for an adult. Filtering instructions 322 indicated by a user profile 320 for a household member may have a higher priority than filtering instructions 322 indicated by a user profile 320 for a guest. Filtering instructions and/or user profiles 320 may be ranked according to any algorithm or appropriate logic.

According to some aspects of this disclosure, a user profile 320 may include different filtering instructions 322 associated with a user 132 for different time windows, such as at different times of the day. For example, user profile 320 may include stringent filtering instructions 322 for daytime and/or a prime content viewing time, and relaxed filtering instructions 322 for evening and/or late night. Stringent filtering instructions 322 may include, but are not limited to, more filtering types of content that may not be indicated by a user 132 but may still be identified (e.g., by a predictive model, etc.) as being sensitive to a particular type of user, such as a child, a minor, or elderly individual. Relaxed filtering instructions 322 may include, but are not limited to, solely filtering types of content indicated by a user 132 and/or a user profile 320. Accordingly, different filtering instructions may be applied at different times of the day.

Once user 132 and/or user profile 320 have been identified, requested content items and/or content items determined to be experiencing playback may be filtered according to filtering instructions 322 indicated by a user profile 320 associated with the user 132. Content items may be filtered according to user-defined filtering instructions and/or or the like either via content analysis and filtering module 123 included with content server(s) 120 or via content analysis and filtering module 326 included with media device(s) 106. Content analysis and filtering module 326 and content analysis and filtering module 123 may be similarly configured and perform similar functions.

According to some aspects of this disclosure, filtering content items may be performed via a multi-step, overlay-based approach rather than manipulating the actual content item. For example, content analysis and filtering module 123 may include a predictive model trained to identify timestamps and regions in a content item where types of content indicated by filtering instructions 322 occur and/or appear. A predictive model may identify patterns, objects, and features in images and/or frames of content items indicative of types of content such as sensitive and/or phobia-triggering content. For example, a predictive model may include one or more convolutional neural networks (CNNs) trained on labeled data for image and video recognition tasks.

According to some aspects of this disclosure, predictive models may be trained to implement object detection techniques including, but not limited to, single shot multi-box detection, sliding window object detection, recurrent convolutional neural networks (R-CNN), Fast R-CNN, Faster R-CNN, You Only Look Once (YOLO), and/or the like to identify objects or types of content in content items that correspond to and/or related to objects or types of content indicated by filtering instructions. Objects or types of content in content items that correspond to and/or related to objects or types of content indicated by filtering instructions may be classified by one or more predictive models using a siamese neural network (SNN), discriminant analysis, decision tree analysis, a nearest neighbor (NN) algorithm (e.g., k-NN models, replicator NN models, etc.), a statistical algorithm (e.g., Bayesian networks, etc.), a clustering algorithm (e.g., k-means, mean-shift, etc.), other neural networks (e.g., reservoir networks, artificial neural networks, etc.), support vector machines (SVMs), logistic regression algorithms, linear regression algorithms, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, a combination thereof and/or the like.

According to some aspects of this disclosure, to implement user-based content filtering, content analysis and filtering module 123 and/or content analysis and filtering module 326 may apply various filtering effects to content items. For example, a filtering effect may include dynamically overlaying a blurred, colored, and/or image-blocking region (or mask) on portions of a content item during playback at the identified timestamps where the type of content indicated by filtering instructions occurs. According to some aspects of this disclosure, the size and/or shape of a blurred, colored, and/or image-blocking region (or mask) may be based on the depicted size and/or shape of the type of content indicated by filtering instructions occurring in a content item.

For example, when a type of content indicated by filtering instructions, such as an object, is identified in a content item, each pixel of the object may be identified. semantic segmentation may be used to classify each pixel of the depicted object into a category (e.g., "gun", "blood", etc.). Instance segmentation may be used to classify pixels and distinguish between individual object instances. Once an image-blocking region (or mask) is identified for the object, a filter such as a Gaussian blur filter, a textual overlay filter (e.g., text may include closed captioning, warnings/notifications, advertisements, scene summaries, translations or transcriptions of spoken or depicted, etc.), a color balance/replacement filter (e.g., color may be adjusted for colorblindness, etc.), and/or the like may be applied only to the pixels within the image-blocking region (or mask).

According to some aspects of this disclosure, an image-blocking region (or mask) for a type of content indicated by filtering instructions within a content item may be used to define where to place alternative or replacement content including, but not limited to, a static image, replacement video content, dynamically generated graphics, and/or the like.

Figure 4:
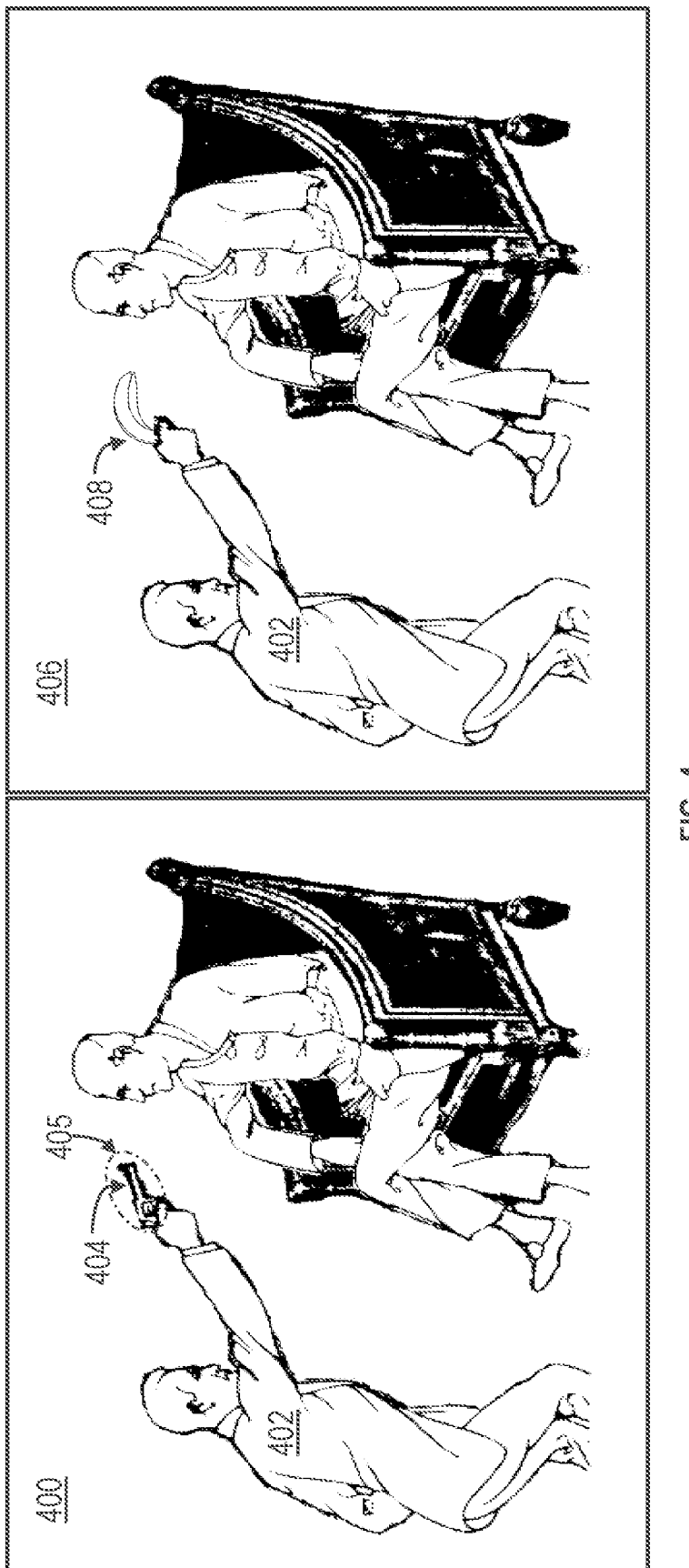
FIG. 4 illustrates an example scene and an example filtered scene of a content item, according to some aspects of this disclosure.

FIG. 4 shows an example scene 400 of a content item and an example filtered scene 406 of the content item. Scene 400 depicts character 402 holding a gun 404. Gun 404 may be a type of content that should be filtered according to filtering instructions indicated by a user profile 320 for a user 132 that requested the content item. Content analysis and filtering module 123 and/or content analysis and filtering module 326 may identify each pixel associated with the gun 404 within frames of the requested content item. may be identified. Semantic segmentation may be used to classify each pixel of the gun 404 into a category, for example, "gun". An image-blocking region 405 may be identified for the gun 404.

Image-blocking region 405 may be determined based on dimensions (e.g., size, shape, etc.) and pixel coordinates of the gun 404. The image-blocking region 405 may define where to place alternative or replacement content to facilitate user-based content filtering. In filtered scene 406, replacement content 408 is generated as an overlay to the gun 404. The dimensions (e.g., size, shape, etc.) and pixel coordinates of the replacement content 408 are mapped to the dimensions (e.g., size, shape, etc.) and pixel coordinates of the gun 404. According to some aspects of this disclosure, the position and/or orientation of replacement content 408 may be adjusted in real-time during playback to match the location of the gun 404. For example, when an identified type of content is a moving object, an overlay used to filter the type of content may be adjusted by continuously tracking (e.g., via techniques including Simple Online and Realtime Tracking (SORT), DeepSORT, etc.) the object across frames of the content item and updating the positioning coordinates of the overlay accordingly.

Replacement content 408 in filtered scene 406 is represented as a banana but could be any image and/or replacement content. According to some aspects of this content, filtering instructions indicated by a user profile may indicate the type of replacement content to be used to replace types of content in content items. According to some aspects of this content, a predictive model may suggest/recommend the type of replacement content. A suggestion/recommendation of the type of replacement content to be used may be based on historical replacement preferences for a user (e.g., a balloon may be recommended as replacement content if a balloon or similar object has been used as replacement content before, etc.), an identified demographic for a user, trending and/or popular replacement content (e.g., identified via crowdsource server(s) 130, etc.), a location of a media device 106 (e.g. if a media device is identified in a restaurant, then replacement content that matches food items, products provided at the restaurant, or a company logo may be suggested/recommended, etc.), and/or the like.

Content analysis and filtering module 123 and/or content analysis and filtering module 326 may apply any filtering effects to content items to facilitate user-based content filtering. According to some aspects of this disclosure, filtering effects may include visual indicators including, but not limited to, displayed notifications, audible warnings, text warnings, icons, replacement content, and/or the like that appear where (e.g., at the exact occurrence or before) a type of content indicated by filtering instructions occur. For example, an on-screen warning may be displayed shortly before phobia-triggering and/or sensitive content appears.

According to some aspects of this disclosure, filtering effects may include audio content including, but not limited to, an audible summary, description, commentary, and/or the like output based on an occurrence within a content item of a type of content indicated by filtering instructions. For example, audio content may be output as an audible voice (e.g., a computer and/or artificial intelligence-generated voice, a pre-recorded user voice, etc.) in a language specified by a user profile 320 to describe phobia-triggering and/or sensitive content, comment on phobia-triggering and/or sensitive content, notify of upcoming phobia-triggering and/or sensitive content.

According to some aspects of this disclosure, audio content may also be output with visual representation (e.g., graphics, text, captions, subtitles, etc.) of the audio content. A content item may be associated with metadata 124 that facilitates descriptive channel audio and/or subtitle/caption tracks that may be used to output audio content relating to phobia-triggering and/or sensitive content. For example, in a situation where a filtering effect is used or will be used to obscure a scene or portion of a movie where blood, weapons, violence, and/or the like is depicted, an audible statement such as "the current/next portion of this movie depicts blood, weapons, violence, and/or the like," to inform a user 134 that phobia-triggering material indicated by filtering instructions is being depicted and/or is upcoming. As another example, filtering effects may include causing a display of a media device 106 to darken, output a black screen, and/or the like while outputting audio content such as "look away now,"

when phobia-triggering content is upcoming, or "there was a lot of blood but you can look again now," once phobia-triggering content has occurred and/or been visually filtered.

According to some aspects of this disclosure, content analysis and filtering module 123 and/or content analysis and filtering module 326 may determine a filtering effect to apply to a content item based on a media license, contractual information, copyright privilege, and/or the like. For example, before applying a filtering effect, content analysis and filtering module 123 and/or content analysis and filtering module 326 may review and/or access a media license, contractual information, copyright priviledge, and/or the like to identify which filtering effects are permissible. A filtering effect may be selected from a list of identified permissible filtering effects. For example, a user 132 may use a user interface to select a filtering effect from a list of identified permissible filtering effects. Alternatively, a predictive model may select a filtering effect from identified permissible filtering effects based on a forecast of how effective the filtering effect will be in filtering sensitive and/or phobia-triggering content.

According to some aspects of this disclosure, to implement user-based content filtering, content analysis and filtering module 123 and/or content analysis and filtering module 326 may, may generate and associate (or stream) metadata (e.g., filtering data, metadata 124, etc.) that contains information and/or instructions on when and where to apply the filtering effects. Media device 106 may then interpret the metadata (e.g., metadata 124, etc.) and use one or more video playback libraries to apply the filtering effects in real-time during playback. This ensures the actual DRM-protected content items remain unaltered. When user-based content filtering is performed by content analysis and filtering module 123, a content server 120 may send a media device 106 a version of a content item (e.g., a modified content item) with the filtering effects applied. For example, an originally requested content item may remain unaltered and protected by DRM, and a separate temporary stream with overlaid filtering effects may be generated for playback by a media device 106.

According to some aspects of this disclosure, metadata (e.g., filtering data, metadata 124, etc.) may include trick mode information such as time markers or time codes associated with a trick-play operation for the particular content item. The metadata may include the duration of the trick-play operation. The duration of the trick play operation may correspond to the duration that a type of content indicated by filtering instructions is depicted within the content item. Media device(s) 106 may use trick mode information to cause the content item to automatically fast-forward, pause, and/or otherwise alter the playback of the content item when a timestamp associated with the type of content is reached. Trick mode information may be user-defined, crowd-source defined, machine learning algorithm and/or predictive model defined, and/or the like.

According to some aspects, user-based content filtering may modify original content items. For example, when a content item is requested, content analysis and filtering module 123 and/or content analysis and filtering module 326 may access a database and/or lookup table to identify associated DRM licensing and/or related information for the content item. When, based on the licensing information, modification of the content item is deemed acceptable, types of content indicated by filtering instructions may be filtered from content items by modifying pixels associated with the identified occurrence of the type of content to alter or obfuscate a visual representation of the identified occurrence of the type of content within the content item.

According to some aspects of this disclosure, a trick mode operation may be followed by a notification displayed for the content item that requests an interaction (e.g., a selection of an interactive element, a play button, etc.) from a user 132 to resume normal playback. Before resuming normal playback, a summary of any skipped scene of the content item may be displayed. According to some aspects of this disclosure, audio content related to any skipped scene of the content item may be output before resuming normal playback. For example, audio content may include, but is not limited to, an audible summary and/or description of any skipped scene or portion of a content item, commentary regarding any skipped scene or portion of a content item, and/or the like. For example, audio content may be output as an audible voice (e.g., a computer and/or artificial intelligence-generated voice, a pre-recorded user voice, etc.) in a language specified by a user profile 320. According to some aspects of this disclosure, the audio content may also be output with a visual representation (e.g., graphics, text, captions, subtitles, etc.) of the audio content. As described, a content item may be associated with metadata 124 that facilitates descriptive channel audio and/or subtitle/caption tracks that may be used to output audio content relating to any skipped scene or portion of the content item.

FIG. 5 shows a flowchart of an example method 500 for user-based content filtering, according to some aspects of this disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to the aspects of those figures. A computer-based system (e.g., multimedia environment 102, multimedia environment 300, content server(s) 120, etc.) may facilitate user-based content filtering.

In 502, content server(s) 120 identifies a type of content indicated by a user profile associated with a request for a content item.

In 504, content server(s) 120 identifies an occurrence of the type of content within the content item. For example, content server(s) 120 identifies the occurrence of the type of content within the content item by inputting the content item into a predictive model trained to identify types of content in content items. Content server(s) 120 receives an indication of the occurrence of the type of content within the content item from the predictive model.

In 506, content server(s) 120 generates filtering data that includes one or more instructions for user devices to alter, obfuscate, and/or the like a visual representation of the identified occurrence of the type of content during playback. According to some aspects of this disclosure, to cause the visual representation of the identified occurrence of the type of content to be altered or obfuscated during playback of the filtering data, a user device associated with the user profile may parse the filtering data and identify the instructions that, when executed, interpreted, and/or performed, cause the user device to display replacement content overlaid on the identified occurrence of the type of content during playback of the content item. The replacement content may be indicated by the user profile or indicated by a predictive model based on an evaluation of: a type of user associated with the user profile, the content item, historic content item playback information, and/or the like. The replacement content may include an advertisement, video content, an icon, a textual notification, a blackout screen, a shape with a blurred image effect, and/or the like.

In 508, content server(s) 120 sends the content item and the filtering data to the user device associated with the user profile.

According to some aspects of this disclosure, method 500 may further include content server(s) 120 identifying another type of content indicated by at least one of the user profile or another user profile associated with another request for another content item. Content server(s) 120 may identify an occurrence of the other type of content within the other content item. Content server(s) 120 may generate additional filtering data that instructs user devices to display a notification before a visual representation of the identified occurrence of the other type of content during playback. Content server(s) 120 may send the other content item and the additional filtering data to at least one of the user device or another user device associated with the other user profile.

According to some aspects of this disclosure, method 500 may further include identifying a user in proximity to the user device. For example, the user may be identified based on information received from one or more sensing devices associated with the user device. The user profile may be identified based on the identified user. For example, identifying information for the user may be mapped to identifying information indicated by the user profile.

Figure 6:
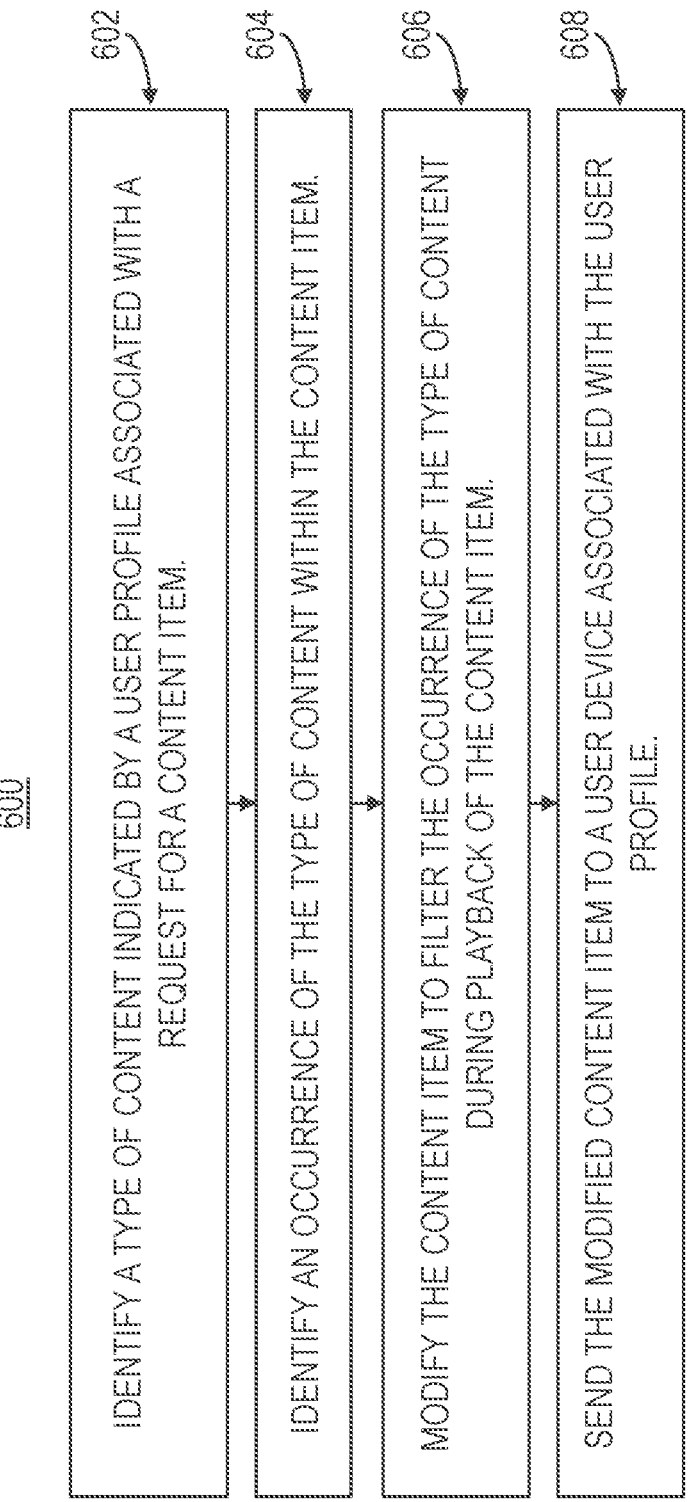
FIG. 6 illustrates a flowchart of an example method for user-based content filtering, aspects of this disclosure.

FIG. 6 shows a flowchart of an example method 600 for user-based content filtering, according to some aspects of this disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-4. However, method 600 is not limited to the aspects of those figures. A computer-based system (e.g., multimedia environment 102, multimedia environment 300, content server(s) 120, etc.) may facilitate user-based content filtering.

In 602, content server(s) 120 identifies a type of content indicated by a user profile associated with a request for a content item.

In 604, content server(s) 120 identifies an occurrence of the type of content within the content item.

In 602, content server(s) 120 modifies the content item to filter the occurrence of the type of content during playback of the content item. For example, to modify the content item to filter the occurrence of the type of content during playback of the content item pixels associated with the identified occurrence of the type of content may be modified to alter or obfuscate a visual representation of the identified occurrence of the type of content within the content item.

In 602, content server(s) 120 sends the modified content item to a user device associated with the user profile.

Figure 7:
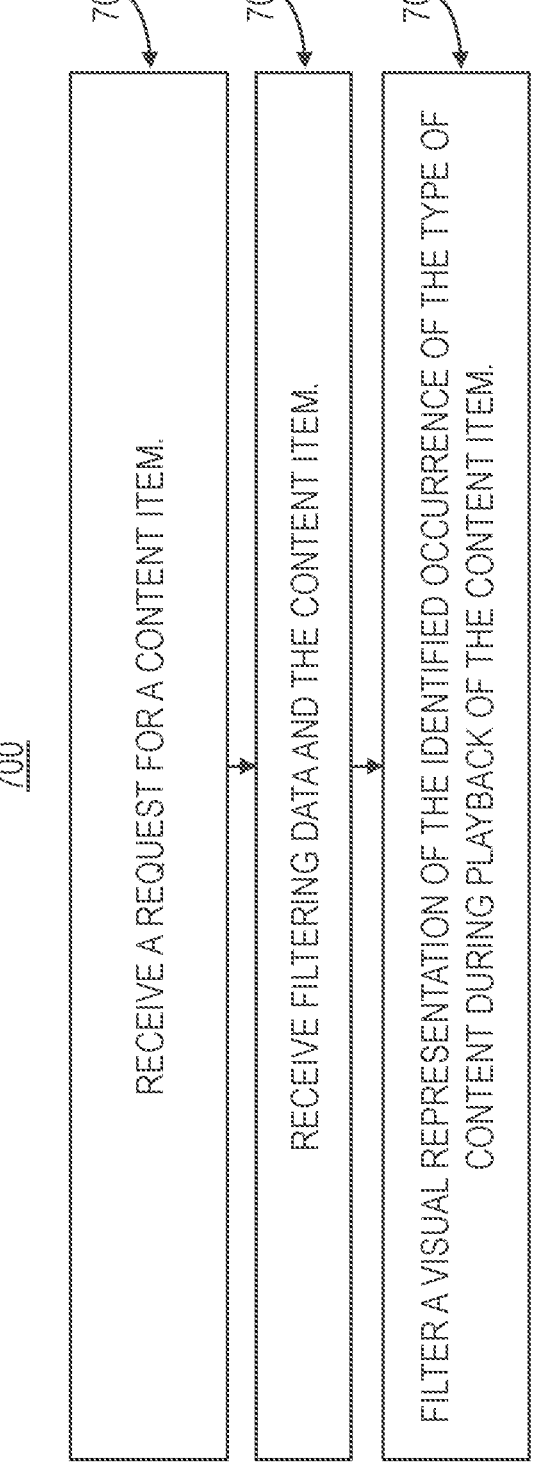
FIG. 7 illustrates a flowchart of an example method for user-based content filtering, aspects of this disclosure.

FIG. 7 shows a flowchart of an example method 700 for user-based content filtering, according to some aspects of this disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-4. However, method 700 is not limited to the aspects of those figures. A computer-based system (e.g., the multimedia environment 102, multimedia environment 300, content server(s) 120, etc.) may facilitate user-based content filtering.

In 702, media device(s) 106 receives a request for a content item. For example, a user may use a user interface and/or remote control 110 to send a request for a content item to media device(s) 106.

In 704, media device(s) 106 receives filtering data and the content item. For example, media device(s) 106 may receive the filtering data and the content item based on a type of content indicated by a user profile associated with the request for the content item.

According to some aspects of this disclosure, a user may be identified in proximity to media device(s) 106. For example, the user may be identified based on information received from one or more sensing devices associated with media device(s) 106. The user profile may be identified based on the identified user. For example, identifying information for the user may be mapped to identifying information indicated by the user profile.

According to some aspects of this disclosure, the user profile may be identified based on user credentials (e.g., login information, etc.) provided to media device(s) 106, etc.). According to some aspects of this disclosure, voice recognition, facial recognition, or other biometrics captured by media device(s) 106 may be used to identify the user profile. According to some aspects of this disclosure, the user profile may be identified based on usage data, where media device(s) 106 (and/or content server(s) 120 or system server(s) 126) analyze interaction patterns (e.g., clicks, viewing history, dwell times, etc.) to predict or identify the user profile. According to some aspects of this disclosure, the user profile may be identified based on any method.

In 706, media device(s) 106 filters a visual representation of the identified occurrence of the type of content during playback of the content item. For example, media device(s) 106 may filter the visual representation of the identified occurrence of the type of content during playback of the content item according to an instruction included with the filtering data. According to some aspects of the disclosure, to filter (e.g., alter, obfuscate, etc.) the visual representation of the identified occurrence of the type of content during playback of the content item the filtering data may instruct media device(s) 106 to display a shape with a blurred image effect overlaid on the identified occurrence of the type of content during playback of the content item. According to some aspects of the disclosure, to filter (e.g., alter, obfuscate, etc.) the visual representation of the identified occurrence of the type of content during playback of the content item the filtering data may instruct media device(s) 106 to display replacement content overlaid on the identified occurrence of the type of content during playback of the content item.

Example Computer System

Figure 8:
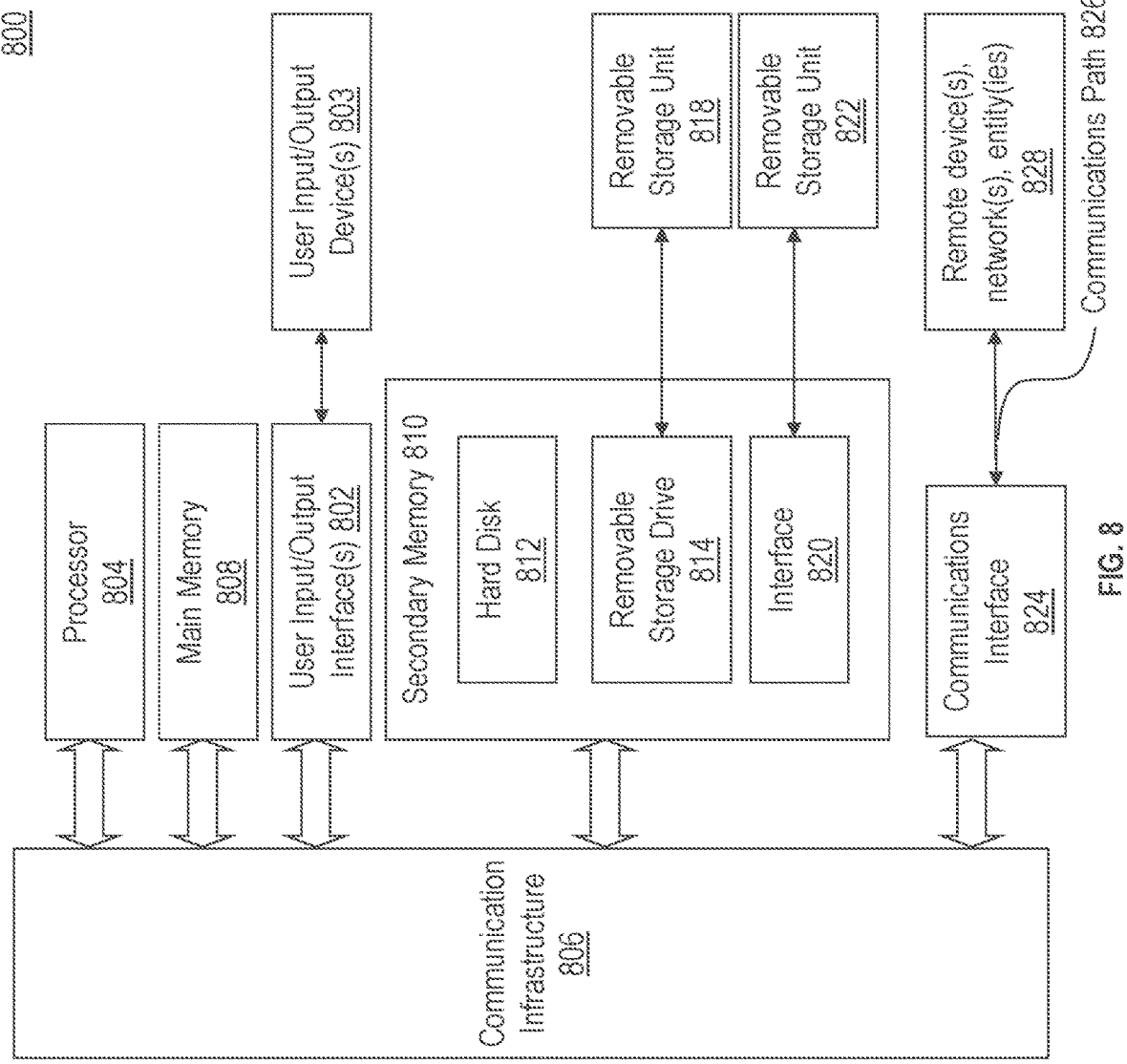
FIG. 8 illustrates an example computer system useful for implementing various aspects of this disclosure.

Various embodiments may be implemented, for example, using one or more well-known computer systems, such as computer system 800 shown in FIG. 8. For example, the media device 106 and/or any other device or component described herein may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer-usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for user-based content filtering, comprising:
identifying, by at least one computer processor, a type of content indicated by a user profile associated with a request for a content item;
identifying an occurrence of the type of content within the content item;
selecting trending content identified by a crowdsource server as replacement content;
generating filtering data that comprises an instruction for a user device associated with the user profile to alter or obfuscate a visual representation of the occurrence of the type of content with the replacement content during playback of the content item; and
sending, to the user device, the content item and the filtering data.

2. The computer-implemented method of claim 1, wherein the identifying the occurrence of the type of content within the content item comprises:
inputting the content item into a predictive model trained to identify types of content in content items; and receiving an indication of the occurrence of the type of content within the content item from the predictive model.

3. The computer-implemented method of claim 1, wherein to alter or obfuscate the visual representation of the occurrence of the type of content, the filtering data comprises one or more instructions for the user device to display a shape with a blurred image effect overlaid on the occurrence of the type of content during playback of the content item.

4. The computer-implemented method of claim 1, wherein to alter or obfuscate the visual representation of the occurrence of the type of content, the filtering data comprises one or more instructions for the user device to display the replacement content overlaid on the occurrence of the type of content during playback of the content item.

5. The computer-implemented method of claim 4, wherein the replacement content is indicated by the user profile or indicated by a predictive model based on at least one of a type of user associated with the user profile, the content item, or historic content item playback information.

6. The computer-implemented method of claim 1, further comprising:
identifying another type of content indicated by at least one of the user profile or another user profile associated with another request for another content item;
identifying an occurrence of the other type of content within the other content item;
generating additional filtering data that comprises one or more instructions for the user devices to display a notification before a visual representation of the occurrence of the other type of content during playback; and
sending the other content item and the additional filtering data to at least one of the user device or another user device associated with the other user profile.

7. The computer-implemented method of claim 1, wherein the user profile is a first user profile for a first user, the computer-implemented method further comprising:
identifying, based on information received from one or more sensing devices associated with the user device, the first user and a second user in proximity to the user device; and
identifying a first priority ranking for the first user profile and a second priority ranking for a second user profile for the second user,
wherein the type of content indicated by the first user profile is identified based on the first priority ranking exceeding the second priority ranking.

8. A system, comprising:
one or more memories; and
at least one processor each coupled to at least one of the memories and configured to perform operations for user-based content filtering, the operations comprising:
identifying a type of content indicated by a user profile associated with a request for a content item;
identifying an occurrence of the type of content within the content item;
selecting trending content identified by a crowdsource server as replacement content;
generating filtering data that comprises an instruction for a user device associated with the user profile to alter or obfuscate a visual representation of the occurrence of the type of content with the replacement content during playback of the content item; and
sending, to the user device, the content item and the filtering data.

9. The system of claim 8, wherein the identifying the occurrence of the type of content within the content item comprises:

inputting the content item into a predictive model trained to identify types of content in content items; and receiving an indication of the occurrence of the type of content within the content item from the predictive model.

10. The system of claim 8, wherein to alter or obfuscate the visual representation of the occurrence of the type of content, the filtering data comprises one or more instructions for the user device to display a shape with a blurred image effect overlaid on the occurrence of the type of content during playback of the content item.

11. The system of claim 8, wherein to alter or obfuscate the visual representation of the occurrence of the type of content, the filtering data comprises one or more instructions for the user device to display the replacement content overlaid on the occurrence of the type of content during playback of the content item.

12. The system of claim 11, wherein the replacement content is indicated by the user profile or indicated by a predictive model based on at least one of a type of user associated with the user profile, the content item, or historic content item playback information.

13. The system of claim 8, the operations further comprising:

identifying another type of content indicated by at least one of the user profile or another user profile associated with another request for another content item;

identifying an occurrence of the other type of content within the other content item;

generating additional filtering data that comprises one or more instructions for the user devices to display a notification before a visual representation of the occurrence of the other type of content during playback; and sending the other content item and the additional filtering data to at least one of the user device or another user device associated with the other user profile.

14. The system of claim 8, wherein the user profile is a first user profile for a first user, and wherein the operations further comprise:

identifying, based on information received from one or more sensing devices associated with the user device, the first user and a second user in proximity to the user device; and identifying a first priority ranking for the first user profile and a second priority ranking for a second user profile for the second user, wherein the type of content indicated by the first user profile is identified based on the first priority ranking exceeding the second priority ranking.

15. A non-transitory computer-readable medium having instructions stored thereon that, when executed by at least one computing device, cause the at least one computing device to perform operations for user-based content filtering, the operations comprising:

identifying a type of content indicated by a user profile associated with a request for a content item;

identifying an occurrence of the type of content within the content item;

selecting trending content identified by a crowdsource server as replacement content;

generating filtering data that comprises an instruction for a user device associated with the user profile to alter or obfuscate a visual representation of the occurrence of the type of content with the replacement content during playback of the content item; and sending, to the user device, the content item and the filtering data.

16. The non-transitory computer-readable medium of claim 15, wherein the identifying the occurrence of the type of content within the content item comprises:

inputting the content item into a predictive model trained to identify types of content in content items; and receiving an indication of the occurrence of the type of content within the content item from the predictive model.

17. The non-transitory computer-readable medium of claim 15, wherein to alter or obfuscate the visual representation of the occurrence of the type of content, the filtering data comprises one or more instructions for the user device to display the replacement content overlaid on the occurrence of the type of content during playback of the content item.

18. The non-transitory computer-readable medium of claim 17, wherein the replacement content is indicated by the user profile or indicated by a predictive model based on at least one of a type of user associated with the user profile, the content item, or historic content item playback information.

19. The non-transitory computer-readable medium of claim 15, the operations further comprising:

identifying another type of content indicated by at least one of the user profile or another user profile associated with another request for another content item;

identifying an occurrence of the other type of content within the other content item;

generating additional filtering data that comprises one or more instructions for the user devices to display a notification before a visual representation of the occurrence of the other type of content during playback; and sending the other content item and the additional filtering data to at least one of the user device or another user device associated with the other user profile.

20. The non-transitory computer-readable medium of claim 15, wherein the user profile is a first user profile for a first user, and wherein the operations further comprise:

identifying, based on information received from one or more sensing devices associated with the user device, the first user and a second user in proximity to the user device; and identifying a first priority ranking for the first user profile and a second priority ranking for a second user profile for the second user, wherein the type of content indicated by the first user profile is identified based on the first priority ranking exceeding the second priority ranking.

\* \* \* \* \*